United States Patent Office 3,526,081
Patented Sept. 1, 1970

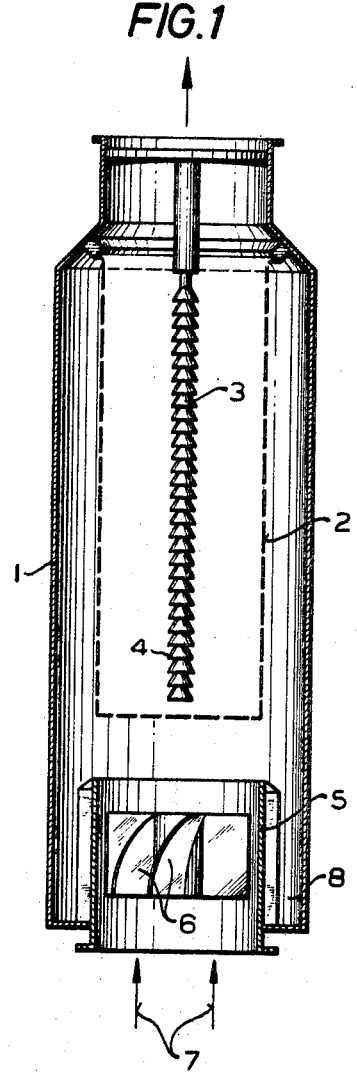
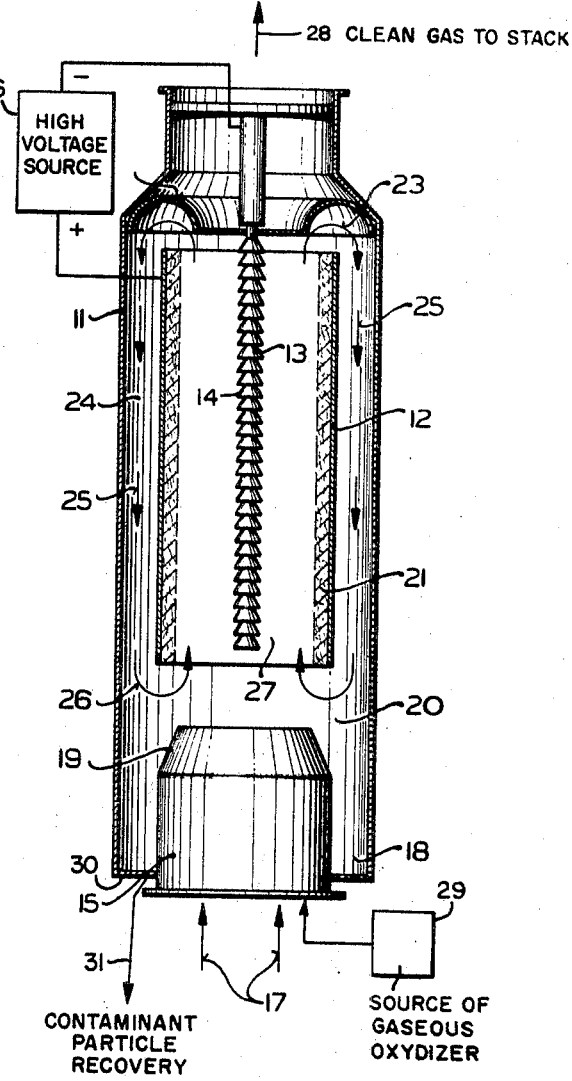

3,526,081
GAS PURIFICATION
Wilhelm Kusters, 45 Eberburgweg, Aachen, Germany
Filed June 14, 1966, Ser. No. 557,466
Claims priority, application Germany, July 9, 1965,
K 56,578
Int. Cl. B03c 3/14
U.S. Cl. 55—127                                        5 Claims

ABSTRACT OF THE DISCLOSURE

Gas purification apparatus having axially aligned entry treatment chamber and exit members, concentric first and second electrodes axially disposed within said treatment chamber, wherein the treatment chamber has a diameter greater than the diameter of the larger of the two electrodes, whereby providing annular channel means between the larger-diameter electrode and the inner wall of the treatment chamber; means for imparting a voltage differential to the electrodes, whereby to form a corona discharge from the central electrode adapted to move contaminant particles within a gas stream present between the electrodes radially outward toward the larger diameter electrode, whereby forming a layer of gas adjacent to the inner surface of the larger-diameter electrode, which is laden with such particles and means straddling the larger-diameter electrode at the downstream end thereof, adapted to deflect at least this laden portion of the gas 180° from its position adjacent to the internal surface of the larger-diameter electrode to a position within the annular passage between the treatment chamber and the larger-diameter electrode.

---

This invention relates to the purification of gases. It more particularly refers to the purification of smoke. It still more particularly refers to the removal of solid particles and oxidizable constituents from smoke.

The exhaust gases of burning most fuels, particularly hydrocarbon fuels, contain constituents and components which are potentially quite harmful and certainly most annoying to plant and animal life, particularly human life, in the area. These smokes contaminate the atmosphere creating health hazards and visibility problems.

It has been desirable for many years to purify these smokes whereby at least some, if not all, of the unpleasant and harmful constituents thereof would be removed therefrom prior to discharge to the atmosphere. It is particularly desirable to remove the solid dust particles, specifically fly ash and carbon black, from the smoke and also to remove the sulfur compounds therefrom.

Many attempts have been made to remove these undesirable materials from exhaust smoke with greater or lesser degree of success. For example, electrostatic precipitators, centrifugal dust collectors and wet dust collectors have been installed to remove the solid particles present in smoke. Gaseous contaminants have been sought to be removed by various methods including absorption both in solid and liquid absorbants and by reaction of the undesirable gaseous component to produce a reaction product which is more readily physically separable from the exhaust gaseous smoke. These reactions have been carried out both with and without the aid of catalysis. For example, sulfur containing gaseous components of exhaust smoke are particularly undesirable. Three particular sulfur containing compounds which are most undesirable in atmospheric exhause gases are sulfur dioxide, carbon disulfide and hydrogen sulfide. These materials can be oxidized with or without the benefit of catalysis to produce carbon oxides, water and sulfur oxides as the case may be. Carbon monoxide can be oxidized to the less undesirable carbon dioxide. Sulfur doxide can be oxidized to produce sulfur trioxide which is more readily absorbable in water than its precursor.

Despite the fact that processes as described above are available and are being used successfully, they still suffer from certain disadvantages which if avoided would be quite beneficial both to industry and to the general populous. One of the most serious disadvantages in prior art smoke contaminant removal systems is the fact that solid and gaseous contaminants are generally removed sequentially thus necessitating double installation with attendant increased capital and operating cost as well as increased space required for installation. Other disadvantages attend to the particular contaminant removal means.

Water soluble gaseous contaminants have been removed from exhaust smoke by means of passing the smoke into intimate contact with water. This can be accomplished by bubbling the smoke through a water reservoir or by passing droplets of water co- or counter current to the flow of exhaust gas. While the water absorbs at least some of the water soluble contaminants, some of the water is entrained or otherwise admixed with the smoke. In some cases, water containing the dissolved contaminants is carried along with the exhaust gases thereby defeating the very purpose of the water absorption operation. In addition, and probably more important, the smoke gases are cooled by passing through a water absorption operation as well as being saturated with water. This leads to two difficulties. In the first place, smoke stacks operate on the chimney effect which is markedly reduced as the stack gases are reduced in temperature, whereby efficient smoke exhaust through the stack is impaired or may even be lost. In the second place, the water saturated gases leaving the stack are both cooler and heavier by reason of their water content and therefore, rather than rising into the atmosphere and dispersing, these gases tend to settle in the vicinity of the stack in a more concentrated form where the stack gases are not diluted by the air to any appreciable extent, and thus, they tend to remain an undesirable element. Further, as these stack gases tend to settle, they may form fog, smog, or ice under certain weather conditions.

Solid particle contaminants in smoke are generally removed, as noted above, by centrifugal or electrostatic means. In centrifugal precipitation means, the input velocity of the smoke is maintained at a high level in order to develop high centrfugal force necessary for efficient solid particle removal. The maintenance of high gas velocities as well as adequate throughput rates necessitate the expenditure of large amounts of energy which is not desirable from an economic point of view.

In the case of electrostatic dust precipitations, the usual installation involves a charged electrode and means for imparting a charge to the solid contaminant particles in the smoke. The charged particles are attracted to and precipitate on the charged electrode. The charged electrode with its deposit of precipitated solid particles is continually or intermittently subjected to shock or vibration in order to loosen the precipitated particles from the electrode and cause them to fall to a collection system whereby they are removed. In order to have relatively efficient particle removal by electrostatic precipitation means, it is necessary that the gas velocity past the charged electrode be relatively slow. In view of this mode of operation, it can be seen that the electrostatic dust precipitator installations are generally quite large. Such installations are expensive and cumbersome because of their size.

It is therefore an object of this invention to provide improved means for removing contaminants from smoke.

It is another object of this invention to provide means for removing contaminants from smoke which is more efficient than those available in the prior art.

It is a further object of this invention to provide a means for removing both solid and gaseous contaminants from smoke in a single operation.

Other and additional objects will become apparent from a consideration of this entire specification including the claims appended hereto.

In accord with an fulfilling these objects, this invention resides, in one of its aspects in an apparatus adapted to be used for the removal of both solid and gaseous contaminants from exhaust gas. This apparatus comprises a housing containing two electrodes one of which is adapted to be charged to an extent sufficient to cause precipitation of solid particles contained in smoke passing through the apparatus; means for causing said smoke to be in operative association with said electrodes for a contact distance greater than the maximum dimension of said electrodes; and means for inducing a corona discharge between said electrodes.

Another aspect of this invention resides in the means of removing both solid and gaseous contaminants from an exhaust gas by feeding contaminated gas into operable association with a pair of charged electrodes and through the field of a corona discharge whereby the solid particle contaminants are electrostatically precipitated and the gaseous contaminants are oxidized.

Understanding of these and other aspects of this invention will be facilitated by reference to the accompanying drawing in which:

FIG. 1 is a front elevation in section of an apparatus adapted to use in this invention; and FIG. 2 is a front elevation in section of an alternate apparatus adapted to use in this invention.

More particularly, one embodiment of the apparatus of this invention utilizes concentric electrodes within a chamber and means for causing contaminated gas to contact the electrodes in a spiral path whereby the contact time between the electrodes and the gas is substantially increased as compared with the contact time which would be available at the same gas velocity where the contact path was not spiral. Corona discharge is induced between the electrodes and the gaseous contaminants of the spiralling gas passing through the corona discharge are caused to be oxidized.

It has been found desirable to utilize a perforated or screen electrode of the grid type as the discharge electrode. This perforated electrode is used in combination with another electrode in a concetric relationship with the perforate electrode being disposed about the other electrode. The contaminated gas passing between these electrodes along a spiral path has a centrifugal force imparted to it and particularly to the solid contaminant particles contained therein. These particles tend to be disposed toward the outer periphery of the spiral path and hence into the vicinity of the perforate discharge electrode. As these solid particles pass through the perforate electrode, by means of the centrifugal force imparted thereto, they are discharged. The space between the perforate electrode and the apparatus housing is substantially uncharged. Thus, the discharged particles will fall to the bottom of the apparatus within this space wherefrom they can be collected and disposed of.

As noted above, a corona discharge is induced in the space between the perforate electrode and the centrally disposed electrode but adjcent to the central electrode such that the contaminated gas passes through the field of discharge. The field strength between the electrodes is maintained at close to the breakdown field strength and may or may not be high enough to cause arcing. It is preferred in the practice of this invention to maintain the field strength just below that at which arcing will occur.

The intense spray or brush discharge phonenema which occur at the central electrode can be regulated by properly constructing the central electrode as well as by varying the electric power input to the electrode. These discharge phenomena can be markedly increased by constructing the central electrode so as to have outwardly disposed constrictions. Electric charge tends to concentrate at points of smallest cross-section and thus a central electrode having spikes projecting outwardly therefrom is desirable for increasing the discharge phenomena.

As noted above, the corona discharge phenomena present in the vicinity of the centrally disposed electrode induces the reaction of gaseous contaminants. These phenomena further impart a charge to the solid contaminant particles such that they will be attracted to the peripheral electrode and be discharged by this peripheral electrode.

The corona discharge may operate to oxidize the gaseous contaminants in several ways. Corona discharge ionization causes oxygen to be converted to ozone which is itself a strong oxidizing agent. Alternately, or simultaneously, corona discharge ionization causes direct oxidation of oxidizable gaseous contaminants. Thus, sulfur dioxide is converted to sulfur trioxide which combines with water present in the exhaust gas to form sulfuric acid. The sulfuric acid migrates by centrifugal force through the perforate elctrode to be collected along with the solid particles similarly removed from the exhaust gases. In a similar manner, carbon monoxide is oxidized to carbon dioxide which will pass out of the system with the cleaned exhaust gas.

It is within the spirit and scope of this invention to introduce oxygen or other reactant material into reactive relationship with the exhaust gas being purified in order to provide a sufficiently high oxygen concentration to support the oxidation reactions being induced in the exhaust gas. In addition to or instead of adding oxygen, other oxidizing agents, such as ozone, may be introduced. The added oxygen may be introduced into the system by as oxygen, air, air enriched with oxygen, oxygen diluted with other materials, such as for example carbon dioxide, or other similar forms.

It has been found that the apparatus described above is operative to quite efficiently purify contaminant containing exhaust gases. It has been found, that the apparatus described above has a slight deficiency which it would be desirable to further improve. When a perforate outer peripheral electrode is used and the non-gaseous contaminants of an exhaust gas are induced to flow through these perforations into the space between the outer perforate electrode and the housing for the described purification apparatus, it is desirable that these non-gaseous materials settle in this space whereby they can be collected and disposed of. It has been found that under some conditions, turbulence is induced in the space between the peripheral electrode and the housing because part of the exhaust gas passes through the electrode perforations. In addition to the turbulence, there is also imparted somewhat of a rotational moment to the particles and gas in this space. Either the turbulence, the rotational moment or a combination of the two sometimes has the effect of at least partially suspending the non-gaseous contaminants and preventing them from settling as desired.

It is a further aspect of this invention to provide a modified apparatus for purifying exhaust gas which even avoids the sometimes problem referred to above. In this aspect of this invention, the peripheral electrode is constructed as a solid imperforate member. The spiral path of the exhaust gas is maintained so as to impart centrifugal force on the non-gaseous contaminants therein and the corona discharge is induced and maintained as and for the purpose set forth above. Due to the centrifugal force imparted to the exhaust gases and the imperforate nature of the peripheral electrode, the non-gaseous impurities tend to collect in the vicinity of the peripheral electrode and to be moved in the same general direction as the mean forward path of the exhaust gas due to the screw type action of the spiralling exhaust gas.

The outlet end of the apparatus is so constructed that the inner portion of the exhaust gas, that is the portion of the gas which is near the center of the spiral path of the gas, is removed from the purification apparatus in the conventional manner, through a stack or otherwise as is expedient. The outer portion of the exhaust gas however is not permitted egress from the apparatus but rather is directed into the space between the peripheral electrode and the housing for the apparatus wherein it is directed back to the point of the introduction of the unpurified exhaust gas. The non-gaseous particles contained in this "recycle" stream are not suspended therein but fall out and can be conveniently collected for disposal. The gas portion of this recycle stream is reintroduced, along with fresh exhaust gas feed, into operative relationship with the electrode system.

By operating in this manner it is possible to efficiently remove non-gaseous contaminant particles from exhaust gas without encountering suspension thereof as described above. A further and important advantage in this improved mode of operation is that the purification per pass can be reduced since the recycle permits any desirable total residence time. This makes it possible to provide a higher gas velocity in the same size apparatus and thereby permits a greater centrifugal force to be induced in the exhaust gas and its non-gaseous contaminant.

Where concentric electrodes are selected for use in this invention, it has been found desirable to provide a generally cylindrical apparatus. While the process is operable with the apparatus in substantially any spatial relation, it has been found preferable and expeditious to position the apparatus with its axis and mean direction of gas flow vertical with exhaust gas being fed at the base and recovered at the top of the apparatus.

In the embodiment of this invention where an imperforate peripheral electrode is used, the outer portion of the exit gas is recycled through the space between the peripheral electrode and the apparatus housing. In the case where the apparatus is cylindrical in shape a mantle is positioned about the exit end of the apparatus so as to deflect the outer portion of the exit gases into the space between the peripheral electrode and the housing while permitting the inner portion of these gases to exit from the apparatus. This mantle can be in any shape desired. Since the mantle acts as a deflection device, it should be so constructed as to be able to turn the recycle gas stream through 180°. It is preferred to use a deflection plate which is semicircular in cross-section and longitudinally shaped equivalent to the cross-sectional shape of the purification apparatus. Thus in a purification apparatus according to this invention having a circular cross-section, the deflection mantle is preferably the shape of a toroidal section.

It may be desirable in the practice of this invention to increase the speed of the recycle gases passing between the peripheral electrode and the apparatus housing. This can be accomplished by drawing a vacuum of these gases in the direction of reentry thereof into operative association with the electrodes. One suitable way of creating this vacuum is to feed fresh exhaust gas to operaitve association with the electrodes through a nozzle whereby a jet pump effect is created tending to decrease the pressure on the recycle stream and thereby increase its velocity.

As noted above, it is preferred in the practice of this invention to impart a rotational moment to the exhaust gases being purified according to this invention. This rotational or spiral motion can be imparted by suitbly arranging the apparatus and in particular the gas feed to the apparatus. For example, tangential feed into a cylindrical electrode chamber will provide for gas rotation. Alternately the gas may be fed directly into the electrode compartment in axial alignment therewith. In this case rotation can be imparted by the suitable use of vanes or deflections.

Reference is now made to the drawing and particularly to FIG. 1 thereof. An apparatus according to this invention is depicted comprising a housing 1, a peripheral electrode 2, a central electrode 3 having restricted cross-section projections 4 thereon, a feed orifice 5 having guide vanes 6 therein, and means 8 for receiving non-gaseous contaminants separated from a feed exhaust gas 7. In a preferred embodiment of the invention, as depicted in FIG. 1, the purification apparatus is housed in an outer, cylindrical, hollow body 1, which consists of sheet metal or other suitable material. Inside of the housing 1 is a grid-like or screen-like peripheral electrode 2, which is disposed concentrically in the housing. An inner brush-discharge electrode 3 is inserted isolatedly in the center and can be covered with fine spikes 4 to improve the brush effect. The smoke gases 7 are introduced through an orifice 5 in which guiding vanes 6 are located, whereby a slightly rotational moveemnt is imparted to the smoke gases 7 entering in the direction of the arrow, and the gases continue this movement while flowing within the cleaning chamber. All parts which come into contact with the smoke gases and the separated foreign substances must be made of corrosion-resistant material if corrosive substances such as sulfuric acid are contained in the smoke gases or in the separated substances. It is expedient for this purpose to make the electrodes 2 and 3 of corrosion-proof metal, or to provide them with coatings of corrosion-proof metal. The housing 1 consists in this case also of sheet steel or of corrosion-proof metal, or it is provided on its inside with a coating of such metal, or a housing of other corrosion-proof material such as ceramic material or plastic is used.

The solid or liquid particles contained in the smoke gases or formed in them by oxidation processes are moved outwardly by the electrical field and centrifugal forces, and their resultant movement, which is composed of the radial movement imparted to them by the electrical field and centrifugal force and the circulatory movement imparted to them by the rotation of the gas stream, carries them through openings in the peripheral electrode 2 into the space between this electrode 2 and the housing 1, and in this space, in which there is little or no movement, they sink down into pockets 8, whence they can be continuously removed. One special advantage of the invention lies in the fact that the operation of the cleaning apparatus is not disturbed or impaired by the removal of the separated substances from the pockets 8, and that even after long operation, no large amounts of separated solids deposit on the grid or screen-like peripheral electrode 2, so that it is not necessary to clean this electrode 2 at regular intervals of time, as was required in the prior art.

Referring now to the embodiment of this invention shown in FIG. 2, the purification apparatus is contained in a housing 11, which is made of sheet metal or other appropriate material. Within this housing 11 is located a substantially cylindrical peripheral electrode 12, which is disposed concentrically in the housing. On the axis of this cylindrical electrode 12 is positioned inner brush-discharge electrode 13, which electrode 13, as in the apparatus of FIG. 1, can be covered with fine spikes to improve the brush effect. The smoke gases 17 are introduced through an orifice 15, a rotating movement being imparted to the smoke gases by guiding vanes or by tangential injection (not shown), and being continued by the gases while they are flowing within the cleaning chamber. The orifice 15 is somewhat restricted to form a nozzle 19, so that at this point the velocity of flow of the smoke gases is increased and a slight vacuum is produced in the chamber 20 by the injector effect.

As in the means described with relation to FIG. 1, the solid or liquid particles contained in the smoke gases or formed in them by oxidation processes are driven outward by the centrifugal force and by the electrical field, and they concentrate in a relatively thin layer 21 on the inside of the electrode 12 so strongly that at the upper end of the electrode 12 the rest of the smoke gases are practically free of impurities. Above the upper end of the electrode 12, there is disposed a toroidally curved sheet metal baffle 22 by which the outer portion 21 of the smoke gases is segregated from the rest of the smoke gases and, as indicated by the arrows 23, is deflected around into the outer space 24 between the electrode 12 and housing 11. The downward flow of the smoke gases in this chamber 24, as indicated by the arrows 26, is supported by the vacuum produced in area 20. Following this vacuum, the smoke gases flow, as indicated by the arrows 26, back into chamber 27 within the electrode 12, while the solid and liquid particles contained in these downwardly directed smoke gases fall into the pocket 18, from which they can be continually removed.

It will be seen that this apparatus comprises a cylindrical housing 11 (as shown in FIG. 2) extended vertically about vertically extended central axis and two concentric electrodes in housing of which the first is a vertically extending discharge electrode 13 and the second is a vertically extended tubular collector electrode 12. The axis of the two electrodes are identical and both are vertically disposed. The discharge electrode has reduced cross-section portions 14 thereof in order to facilitate the formation of corona discharge. The two electrodes are spaced from each other by conventional means such as a spider or the like. There is included in the apparatus of this invention means 16 for imparting an electrical charge of one polarity to the first electrode and an electrical charge of the opposite polarity to the second electrode for the purpose of creating a corona discharge between the first and second electrodes. Contaminated smoke is introduced into the apparatus through inlet means 15 which inlet means has a tubular member having a vertical axis coincident with the axis of the electrodes which tubular means lies partially within and partially below the lower end of the housing. The upper end of the tubular inlet means is a frusto-conical element having its base dipsosed below its apex with the smaller diameter of this element being smaller than the diameter of the second electrode and spaced below and apart from the lower end of both the first and second electrodes. It is desirable to provide means within the tubular inlet means so operatively constructed and arranged (see FIG. 1 at reference 6) to impart a swirling motion to contaminated smoke being introduced into the apparatus therethrough. There is provided a clean gas discharge means shown schematically at 28, which is operatively constructed and arranged for discharging the portion of the gas purified in the apparatus of this invention which is adjacent the first electrode. This gas may be vented to a stack. There is provided deflecting means 22 disposed down stream of the second electrode which substantially straddles the second electrode in an arc form cross-section from a point intermediate the first electrode and the second electrode to a point intermediate the second electrode and the housing. The deflecting means is suitably a section taken through a toroid on a longitudinal plane which effectively defines the toroid in half perpendicular to its central axis. This section is referred to as a 180° toroidal section. There is also provided means, schematically shown at 29, for introducing gaseous oxidant into the apparatus, suitably through smoke inlet means, and means 30 connecting the lower end of the housing 11 to the tubular inlet means 15 whereby defining an annular space 18 bound by the tubular inlet means 15, the housing 11 and the connecting means 30 for receiving solid contaminate removed from the smoke feed to the apparatus. A means shown schematically at 31 is provided for recovering the precipitated non-gaseous material from the apparatus.

The means of the present invention not only enables smoke gases to be very highly purified of solid and liquid particles, but also permits the gaseous oxidation products of sulfur contained in the smoke gases to be transformed by the influence of the ions formed in the electrical field into a separable compound, so that the emerging smoke gases are also so extensively free of sulfur dioxide that, even when sulfur is added to the material from which the exhaust gases are derived, at the discharge of the cleaning apparatus, the pungent odor of sulfur dioxide is no longer perceptible.

What is claimed is:
1. An apparatus for purifying smoke comprising:
  (a) a cylindrical housing extending vertically about a vertically extending central axis;
  (b) a vertically extending first discharge electrode within said housing and having its vertical axis disposed on said central axis, said discharge electrode having reduced longitudinal cross-section projections thereon;
  (c) a vertically extending tubular imperforate collector second electrode surrounding said first discharge electrode and disposed within said housing and having a second vertically extending central axis disposed on said first central axis, said second electrode being spaced apart from said first electrode and from said housing;
  (d) means operatively constructed and arranged for imparting to said first electrode an electrical charge of one polarity, for imparting to said second electrode an electrical charge of a polarity opposite to said one polarity, and for creating a corona discharge between said first and second electrodes;
  (e) contaminated smoke inlet means to said housing said inlet means comprising a tubular member of smaller diameter than said housing, said tubular means having a vertical axis disposed on said first central axis, said tubular means lying partially within and partially below the space encompassed by said housing, said tubular means having an upper end terminating at a point below and spaced apart from the lower end of both said first and said second electrodes, said tubular means upper end terminating in a frusto-conical element having its base disposed below its apex, the small diameter end of said frusto-conical element having a diameter smaller than said second electrode, and said tubular means containing means operatively constructed and arranged therein for imparting a swirling motion to contaminated smoke passing therethrough;
  (f) clean gas discharge means operatively constructed and arranged for discharging the portion of gas adjacent said first electrode as clean gas from the upper end of said housing to a stack;
  (g) deflecting means disposed downstream of said second electrode, substantially straddling said second elcetrode from a point intermediate said first electrode and said second electrode to a point intermediate said second electrode and said housing, said deflecting means comprising substantially a 180° toroidal section;
  (h) gaseous oxidant introducing means operatively constructed and arranged for introducing a gaseous oxidant into said housing; and
  (i) connecting means connecting the lower end of said housing to said tubular means, the portion of said tubular means disposed within the spaced encompassed by said housing, the lower portion of said housing and said connecting means cooperating with each other to define a contaminant collecting pocket.

2. An apparatus as claimed in claim 1 wherein a means for recovering precipitated material from said housing is provided.

3. An apparatus as claimed in claim 1 wherein said collecting pocket is annular.

4. An apparatus as claimed in claim 1 wherein an outer space is defined between said housing and said second electrode.

5. An apparatus as claimed in claim 1 wherein said frusto-conical element cooperates with contaminated smoke flowing therethrough to create a jet pump effect tending to decrease the pressure on the recycle stream flowing downwardly between said housing and said second electrode and thereby increasing the velocity of the recycle stream.

References Cited

UNITED STATES PATENTS

| | | | |
|---|---|---|---|
| 334,158 | 1/1886 | Beard | 55—279 X |
| 1,024,784 | 4/1912 | Johnson | 55—127 |
| 1,204,906 | 11/1916 | Schmidt et al. | 55—136 X |
| 1,357,886 | 11/1920 | Weston | 55—154 X |
| 1,371,995 | 3/1921 | Nesbit | 55—126 X |
| 1,381,171 | 6/1921 | McGee et al. | 55—9 X |
| 1,579,462 | 4/1926 | Wintermute | 55—154 X |
| 1,605,648 | 11/1926 | Cooke | 55—131 X |
| 1,931,436 | 10/1933 | Deutsch | 55—131 |
| 1,959,752 | 5/1934 | Wintermite | 55—118 |
| 1,333,790 | 3/1920 | Bradley | 55—2 |
| 1,430,246 | 9/1922 | Meredith | 204—302 |
| 1,440,887 | 1/1923 | Nesbit | 55—127 X |
| 2,594,805 | 4/1952 | Rommel | 55—127 |
| 2,664,966 | 1/1954 | Moore | 55—456 X |
| 2,748,888 | 6/1956 | Hodsor | 55—127 |
| 2,751,037 | 6/1956 | MacAfee et al. | 55—456 X |
| 2,806,551 | 9/1957 | Heinrich | 55—456 X |
| 2,841,242 | 7/1958 | Hall | 55—135 X |
| 2,931,458 | 4/1960 | Vane | 55—127 X |
| 3,086,343 | 4/1963 | Stern | 55—456 |
| 3,165,390 | 1/1965 | Parken et al. | 55—431 |
| 3,345,046 | 10/1967 | Versluys et al. | 55—456 X |
| 1,992,113 | 2/1935 | Anderson | 55—148 |
| 2,064,960 | 12/1936 | Thorne | 55—131 X |
| 2,083,801 | 6/1937 | Eddy | 55—150 |
| 2,085,349 | 6/1937 | Wintermute | 55—127 X |
| 2,275,001 | 3/1942 | Anderson. | |
| 2,696,273 | 12/1954 | Wintermute | 55—127 |
| 2,936,851 | 5/1960 | Cook | 55—131 |
| 3,061,537 | 10/1962 | Yagishita | 204—275 |
| 3,157,479 | 11/1964 | Boles | 55—146 |
| 3,188,167 | 6/1965 | Specht. | |
| 3,218,781 | 11/1965 | Allemann et al. | 55—122 |

FOREIGN PATENTS

| | | |
|---|---|---|
| 562,893 | 11/1932 | Germany. |
| 870,549 | 3/1953 | Germany. |
| 792,603 | 4/1958 | Great Britain. |

DENNIS E. TALBERT, Jr., Primary Examiner

U.S. Cl. X.R.

55—131, 134, 139, 152, 154, 396, 457; 23—2; 204—323; 60—30